H. PITCHER.
Wheels for Vehicles.

No. 136,669. Patented March 11, 1873.

Witnesses:

Inventor:
H. Pitcher
per
Attorneys.

UNITED STATES PATENT OFFICE.

HIRAM PITCHER, OF FOND DU LAC, WISCONSIN.

IMPROVEMENT IN WHEELS FOR VEHICLES.

Specification forming part of Letters Patent No. 136,669, dated March 11, 1873.

*To all whom it may concern:*

Be it known that I, HIRAM PITCHER, of Fond du Lac, in the county of Fond du Lac and State of Wisconsin, have invented a new and useful Improvement in Wheels and Axles, of which the following is a specification:

The invention consists in the peculiar mode of combining and arranging the hub with a sleeve and axle made fast together, as hereinafter fully described and pointed out in the claim.

Figure 1:
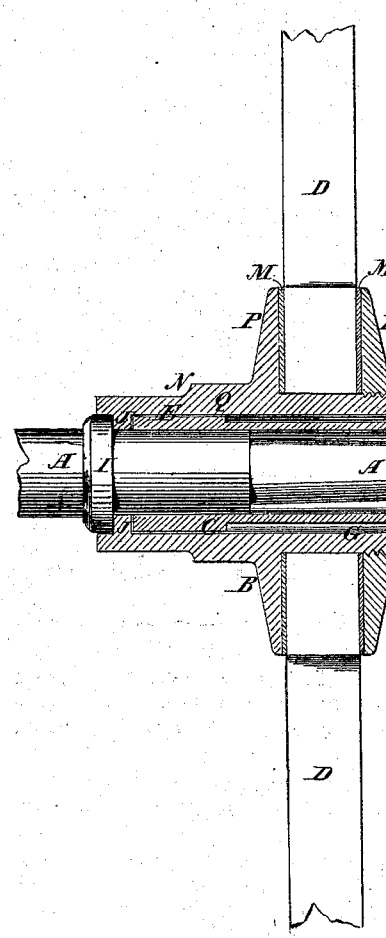
Figure 2:
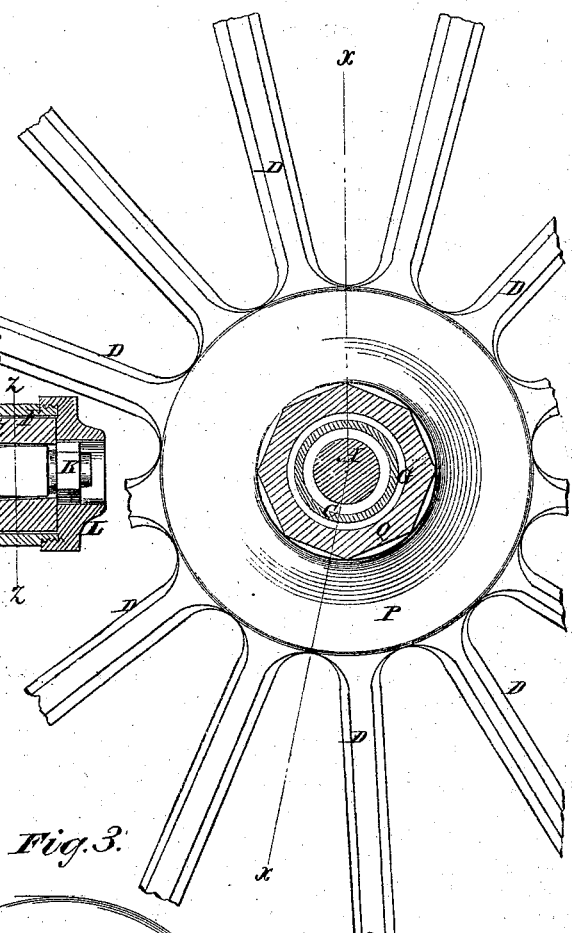
Figure 3:
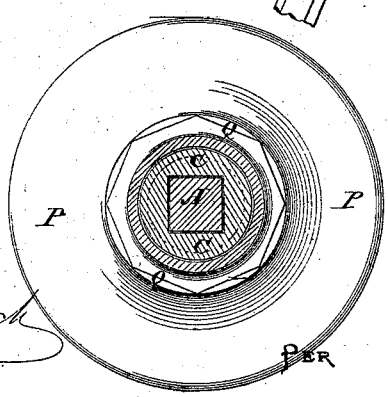

In the accompanying drawing, Figure 1 is a section of the wheel taken on the line $x\,x$ of Fig. 2. Fig. 2 is a section looking to the left from the line $y\,y$ of Fig. 1. Fig. 3 is a section of Fig. 1 taken on the line $z\,z$.

Similar letters of reference indicate corresponding parts.

A is the axle; B, the hub; C, the sleeve of the axle. D represents the spokes. The hub is made in two parts screwed together as represented in the drawing. The axle passes through the sleeve, the outer end being square, which fits the outer end of the sleeve, so that the latter forms the arm or wearing-surface of the axle. The wearing-surface of the sleeve is, at each end thereof, marked E and F, between which is an oil-chamber G. The hub forms the box, the two parts of which have each a bearing for the sleeve, and a flange for supporting the spoke. I is a collar on the axle. J is an interior flange which works against the collar I and against the end of the sleeve. K is a screw-nut on the end of the axle, which bears against the end of the sleeve. L is a cap which screws onto the outer part of the hub, in which is a square orifice for introducing a plug-wrench for turning it on or off. This cap may be closed on the outside, and other means may be employed for turning it. Through this cap oil is introduced to the oil-chamber G. M is a washer, which is made fast to the spokes by means of screws, rivets, or nails. N represents the inner part of the hub, and O the outer part. The ends of the spokes rest upon the former, but the flanges P P are equal in diameter, and support the spokes, as seen in Fig. 1. The spokes entirely fill the space between the flanges so that the washer M rests upon solid wood. The wheel is thus formed without mortises in the hub or tenons on the spokes. Each part of the hub has a polygonal section, Q, by means of which they are readily separated with a wrench.

This makes a most substantial and durable wheel, one that is kept lubricated with very little trouble, as when oil is once introduced into the oil-chamber it cannot escape or waste, but enables the bearings or frictional surfaces to run in oil constantly.

Having thus described my invention, I claim as new and desire to secure by Letters Patent—

The end-squared axle A provided with nut K and collar I, the sleeve C fast thereto and having the wearing-surfaces E F with intermediate oil-chamber Q, and the hub B having collar J and nut L, all constructed, arranged, and put together as and for the purpose described.

HIRAM PITCHER.

Witnesses:
EUGENE HATCH,
V. B. KNOWLES.